(12) United States Patent
Han

(10) Patent No.: US 10,042,526 B2
(45) Date of Patent: Aug. 7, 2018

(54) METHOD AND APPARATUS FOR DISPLAYING THUMBNAIL IMAGE

(71) Applicant: SAMSUNG ELECTRONICS CO., LTD., Suwon-si, Gyeonggi-do (KR)

(72) Inventor: Seung Won Han, Jeonju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 14/195,202

(22) Filed: Mar. 3, 2014

(65) Prior Publication Data
US 2014/0282264 A1    Sep. 18, 2014

(30) Foreign Application Priority Data

Mar. 12, 2013    (KR) .................. 10-2013-0026039

(51) Int. Cl.
*G06F 3/048*    (2013.01)
*G06F 3/0484*   (2013.01)
*G06F 3/0481*   (2013.01)

(52) U.S. Cl.
CPC ...... *G06F 3/04842* (2013.01); *G06F 3/04817* (2013.01)

(58) Field of Classification Search
CPC ........................................ G06F 3/048
See application file for complete search history.

(56) References Cited

U.S. PATENT DOCUMENTS

| | | | | |
|---|---|---|---|---|
| 2004/0196502 A1* | 10/2004 | Mikawa | ............ | H04N 1/00132 358/1.15 |
| 2007/0157242 A1* | 7/2007 | Cordray | ................ | H04H 60/33 725/46 |
| 2010/0060655 A1* | 3/2010 | Huang | ............... | H04N 1/32122 345/543 |
| 2010/0192106 A1* | 7/2010 | Watanabe | ................ | G09G 5/14 715/838 |
| 2014/0129988 A1* | 5/2014 | Liang | .................. | G06F 3/04815 715/838 |

* cited by examiner

*Primary Examiner* — Xuyang Xia
(74) *Attorney, Agent, or Firm* — Drinker Biddle & Reath LLP

(57) ABSTRACT

Disclosed herein are a method and apparatus for displaying a thumbnail image. A plurality of thumbnail images that corresponds to a plurality of files stored in a storage unit is displayed. The plurality of files comprises at least one of a video file or an image file. A thumbnail image is selected from the plurality of thumbnail images. A selected effect is applied to the selected thumbnail image to generate a modified thumbnail image. The modified thumbnail image to which the selected effect has been applied is displayed.

1 Claim, 9 Drawing Sheets

METHOD AND APPARATUS FOR DISPLAYING THUMBNAIL IMAGE

CROSS-REFERENCE TO RELATED APPLICATION(S)

This application claims the priority benefit under 35 U.S.C. § 119(a) from Korean Patent Application No. 2013-0026039, filed on Mar. 12, 2013 in the Korean Intellectual Property Office, the disclosure of which is incorporated herein by reference in its entirety.

BACKGROUND

1. Field

Embodiments of the present disclosure relate to a method and apparatus for displaying a thumbnail image to display an improved thumbnail image in order to search for a desired file.

2. Related Art

With the spread of camcorders or digital cameras, many people easily capture a variety of images. Such a camcorder or digital camera captures video or an image and stores the video or the image in a storage unit. Files stored in the storage unit are classified or named using numbers. For example, with regard to Samsung cameras, files named SAM_XXXX such as SAM_0001.JPG, SAM_0002.MP4, SAM_0003.MP4, SAM_0004.JPG, SAM_0005.MP4, or SAM_0006.MP4 are stored. Most camcorders or cameras function in a similar fashion.

Users may have difficulty recognizing or distinguishing files using only file names, and thus, they may search for a file using a thumbnail image that represents the file. However, when thumbnail images of multiple files are similar, it may still be difficult to distinguish the files and thus search for a desired file using the thumbnail images.

SUMMARY

Various embodiments provide a method and apparatus for displaying an improved thumbnail image by applying an effect to a thumbnail image such that a user may more easily visibly distinguish and thus search for a desired file.

Additional embodiments will be set forth in part in the description which follows and, in part, will be apparent from the description, or may be learned by practice of the embodiments.

In accordance with an embodiment, a method of displaying a thumbnail image includes displaying a plurality of thumbnail images that corresponds to a plurality of files stored in a storage unit. The plurality of files includes at least one of a video file or an image file. A thumbnail image is selected from the plurality of thumbnail images. A selected effect is applied to the selected thumbnail image to generate a modified thumbnail image. The modified thumbnail image to which the selected effect has been applied is displayed.

The selecting may include selecting a file, of the plurality of files, to be viewed by a user. The selected file corresponds to the selected thumbnail image.

The method may further include determining whether viewing of the selected file is complete. Applying may include applying the selected effect to the selected thumbnail image once viewing of the corresponding selected file is completed.

The applying may include applying the selected effect at different intensities based on a number of times the selected file has been viewed.

The selecting may include selecting a file to be distinguished by the user.

The applying may include applying the selected effect to the thumbnail image of only the selected file to distinguish the selected file from other non-selected files.

The selected effect may include at least one of black and white image processing, color processing, or transparency processing.

In accordance with another embodiment, a thumbnail image display apparatus includes a storage unit to store a plurality of files. The plurality of files includes at least one of a video file or an image file. The thumbnail image display apparatus further includes a display unit to display a plurality of thumbnail images that corresponds to the plurality of files stored in the storage unit. The thumbnail image display apparatus further includes a controller to apply a selected effect to a selected thumbnail image of the plurality of thumbnail images to generate a modified thumbnail image. The controller is configured to display the modified thumbnail image on the display unit.

The selected thumbnail image may correspond to a file to be viewed by a user or to a file to be distinguished by the user.

The controller may include a thumbnail generator to generate the modified thumbnail image.

The storage unit may include a thumbnail buffer to store the modified thumbnail images generated by the thumbnail generator.

The thumbnail image display apparatus may include a digital camera, a camcorder, a smart phone, or a personal computer (PC).

According to the proposed method and apparatus for displaying a thumbnail image, the user may more easily search for a file to be viewed by application of a selected effect such as black and white image processing, color processing, transparency processing, etc. to a thumbnail image of video or image file that that has been viewed by a user. The user may more easily search for a file that has been viewed a plurality of times by gradually increasing intensity of a selected effect based on the number of times of viewing the corresponding file. In addition, when the user wants to distinguish selected files from other files, the user may more easily search for a file to be distinguished by application of a selected effect such as black and white image processing, color processing, transparency processing, etc. to a thumbnail image of only the selected file.

BRIEF DESCRIPTION OF THE DRAWINGS

These and/or other embodiments will become apparent and more readily appreciated from the following description of the embodiments, taken in conjunction with the accompanying drawings of which.

DETAILED DESCRIPTION

Reference will now be made in detail to various embodiments of the invention, examples of which are illustrated in the accompanying drawings.

Figure 1:
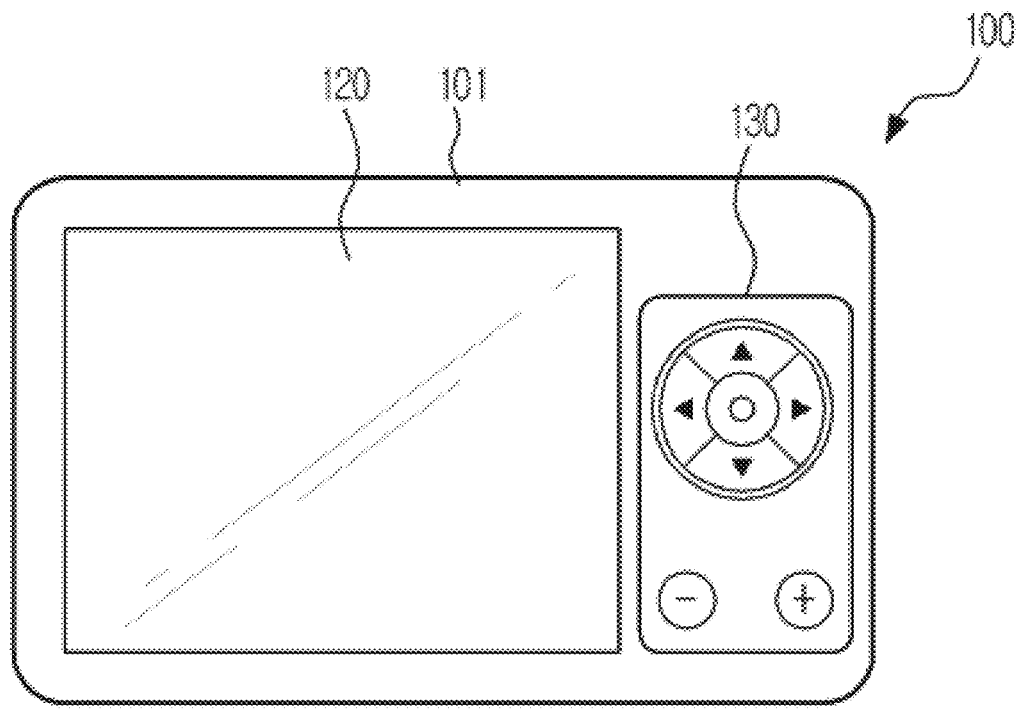
FIG. 1 is a diagram illustrating an example of a thumbnail image display apparatus according to an embodiment of the invention.

FIG. 1 is a diagram illustrating an example of a thumbnail image display apparatus 100 according to an embodiment.

In FIG. 1, the thumbnail image display apparatus 100 includes a main body 101 that forms an outer housing or shell, a display unit 120 formed at one side of the main body 101, and an input unit 130.

FIG. 1 illustrates a digital camera as one example of the thumbnail image display apparatus 100. The thumbnail image display apparatus 100 is not limited thereto and may include a mobile terminal (e.g., a smart phone) or personal computer (PC) including a camcorder or camera (or camera module) to display video or an image.

Figure 2:
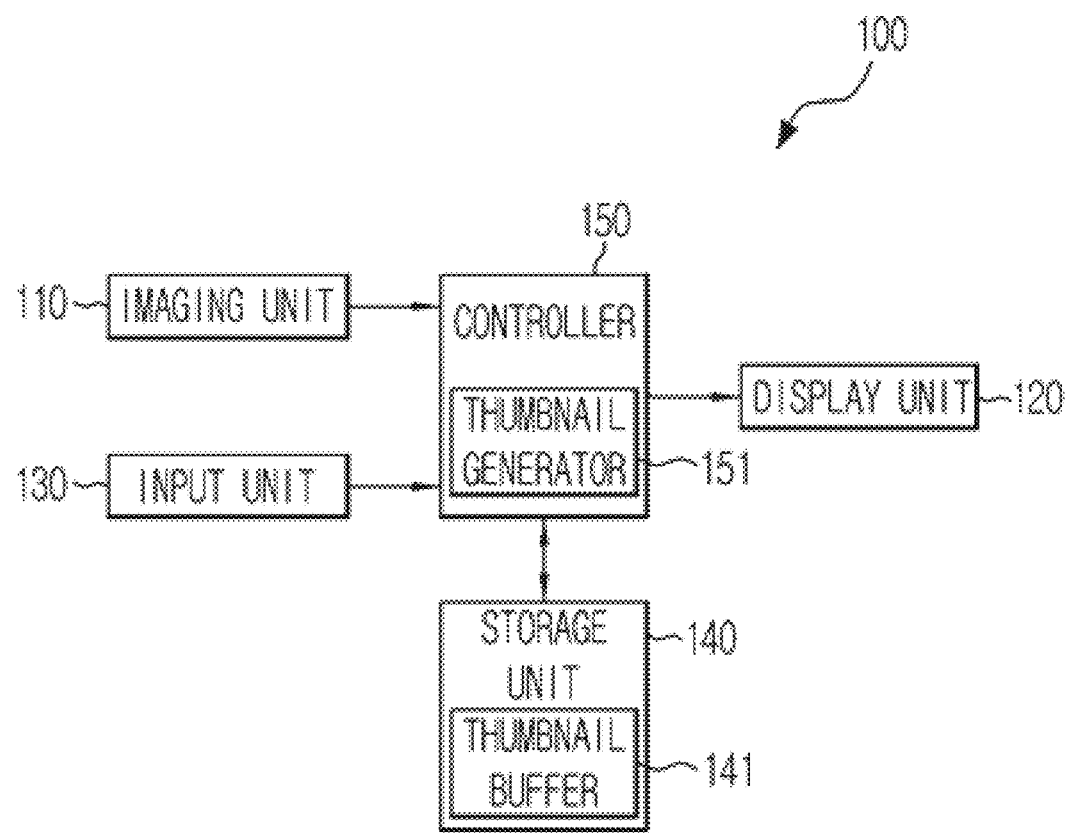
FIG. 2 is a block diagram illustrating a structure of a thumbnail image display apparatus according to an embodiment.

FIG. 2 is a block diagram illustrating a structure of the thumbnail image display apparatus 100 according to an embodiment.

In FIG. 2, the thumbnail image display apparatus 100 includes an imaging unit 110, the display unit 120, the input unit 130, a storage unit 140, and a controller 150.

The imaging unit 110 photographs an object to output image data as video or an image. The imaging unit 110 forms an optical image of the object and detects the formed optical image as digital image data, such as raw image data. The imaging unit 110 may include a lens system (not shown) that includes at least one lens and forms an optical image of the object. The imaging unit may further include an image sensor such as a charge-coupled device (CCD) image sensor or a complementary metal-oxide semiconductor (CMOS) image sensor to detect the formed optical image as digital image data.

In addition, the imaging unit 110 includes an image signal processor (ISP). The imaging unit 110 generates and outputs preview image data based on the raw image data and one or more preset preview setting parameters (e.g., resolution, noise filtering, edge improvement, or other parameters). The raw image data in one example refers to image data that has not been postprocessed (e.g., filtered, or the like) while having full resolution supported by the image sensor. The preview image data in one example refers to postprocessed image data having lower resolution than the raw image data. In addition, each of the raw image data and the preview image data may include consecutive image frames.

According to the present embodiment, the thumbnail image display apparatus 100 includes the imaging unit 110, but alternative embodiments are not limited thereto and may omit the imaging unit 110. In this case, any device that may reproduce video or an image may be used as the thumbnail image display apparatus 100.

The display unit 120 displays a preview image based on the preview image data output from the imaging unit 110 to a user of the thumbnail image display apparatus 100. As the display unit 120, a liquid crystal display (LCD), an organic light emitting diode (OLED) display, an active matrix organic light emitting diode (AMOLED) display, etc. may be used.

The display unit 120 in one example visually provides a menu of a digital camera, input data, function setting information, and various other information to the user.

The display unit 120 in one example performs a function of outputting a boot image, a standby image, a menu image, and other preview images of the thumbnail image display apparatus 100.

In addition, the display unit 120 may display a video or image stored in the storage unit 140, or a portion thereof, as a thumbnail image.

The thumbnail image in one example is a reduced version of a larger original image, used to help the user to easily and quickly recognize, distinguish, and manage many images or files. Thus, the thumbnail image is provided to allow the user to easily manage a plurality of images in a medium to display an image, such as a camcorder, a digital camera, a smart phone, or a personal computer (PC).

The input unit 130 in one example may be used by the user to search for, view, or edit video or image files displayed on the display unit 120 via manipulation by the user of input keys, buttons, a touchscreen, etc. of the input unit 130.

In one example of using input key manipulation of the input unit 130, the thumbnail image display apparatus 100 may load a video or image file stored in the storage unit 140, or a portion thereof, and select an effect to be applied to a thumbnail image of the loaded video or image file. In this case, a variety of effects such as black and white image processing, color processing, transparency processing, or other visual effects may be used as the effect to be applied to the thumbnail image.

In addition, the input unit 130 may receive user input for selection of a focus area or for a photography start during photography.

The storage unit 140 in one example is a memory or non-transitory data storage medium that receives image data output from the imaging unit 110, stores a video or an image file, or stores a thumbnail of the video or image file.

The storage unit 140 may be a read only memory (ROM), a flash memory, a random access memory (RAM), etc. The ROM in one example includes various data and programs for processing and control of the controller 150. The RAM in one example provides a temporary memory for the controller 150 and the ROM provides a region to store various storage data to be updated and maintained. In addition, the memory of the thumbnail image display apparatus 100 according to the present embodiment includes a thumbnail buffer 141 to store thumbnail images of videos or image files and to store a thumbnail image obtained by applying a selected effect to a selected file under control of the controller 150.

For example, in order to distinguish a selected file from other non-selected files, a predetermined function is provided to apply an effect (e.g., black and white image processing, color processing, transparency processing, or other visual effects) to only a thumbnail image of a corresponding file. The video or image files stored in the storage unit 140 are loaded and are displayed on the display unit 120 in the form of thumbnail images. Thus, the user may observe whether the effect is applied to thumbnail images of the video or image files displayed on the display unit 120 and more easily search for the thumbnail image to which the effect is applied and thus visibly distinguished from a plurality of thumbnail images.

In addition, the storage unit 140 may store databases related to user information, documents, background images (a menu image, a standby image, etc.), operating programs, or other elements for operation of the thumbnail image display apparatus 100.

In addition, the storage unit 140 may store programs and data for operation of the thumbnail image display apparatus 100 and may be divided into a program region and a data region. The program region may store a program for control of overall operations of the thumbnail image display apparatus 100, an operating system (OS) for an operation of the thumbnail image display apparatus 100, an application program for display of multimedia content, or other optional functions of a portable terminal (e.g., the thumbnail image display apparatus 100), for example, a camera function, a sound playback function, or an image or video display function. The data region may store data generated based on use of the thumbnail image display apparatus 100 and store an image, video, a phonebook, etc.

The controller 150 controls overall operations of components of the thumbnail image display apparatus 100. In particular, the controller 150 loads the video or image files stored in the storage unit 140 based on a user command input from the input unit 130 and displays the loaded video or image files on the display unit 120 in the form of thumbnail images.

In addition, the controller 150 includes a thumbnail generator 151 that applies a selected effect (black and white image processing, color processing, transparency processing, or other visual effects) to a thumbnail image of the corresponding video or image file to generate improved thumbnail image information (e.g., a modified thumbnail image).

The thumbnail generator 151 applies a selected effect to a thumbnail image such that a user may more easily search for a file that the user wants to see from the plurality of video or image files with thumbnail images displayed on the display unit 120. The selected effect is applied to the thumbnail image by applying the selected effect to a thumbnail image of a corresponding file when a user finishes viewing the corresponding file.

When viewing of the selected file is completed, a thumbnail image to which a selected effect (black and white image processing, color processing, transparency processing, or other visual effects) is applied is generated. In this case, as the number of views of the selected file increases, the selected effect applied to the thumbnail image for that file is gradually increased in intensity. In this case, instead of simply applying the same selected effect to the thumbnail image, a file that has been viewed several times may be identified by an increased intensity of the selected effect.

For example, intensity of transparency processing applied to a corresponding file may be gradually increased in intensity based on the number of times of viewing a predetermined file such that a user may easily search for the file that has been viewed several times.

Hereinafter, processes and advantages of a method of displaying a thumbnail image according to an embodiment will be described.

Figure 3:
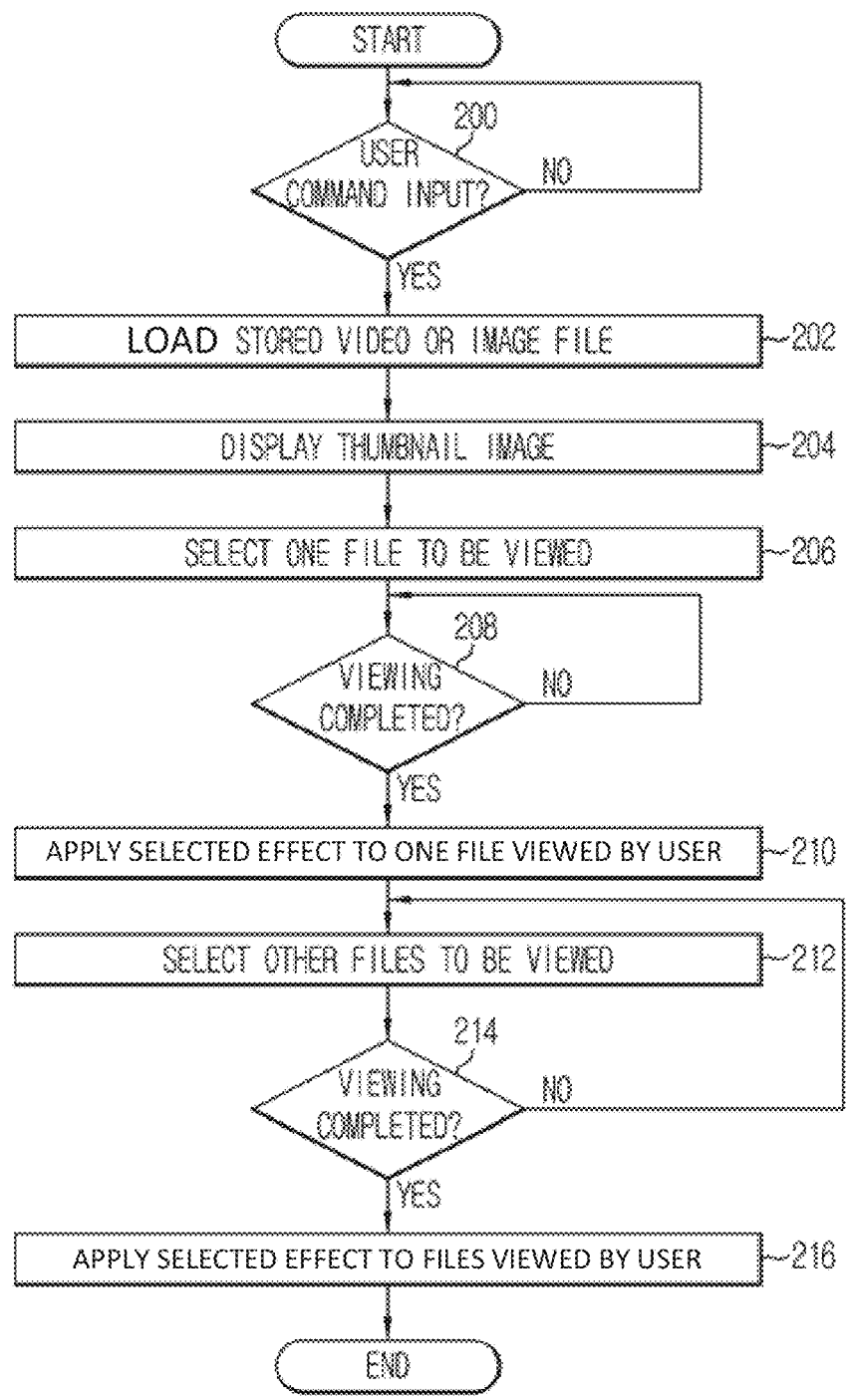
FIG. 3 is a flowchart of a method of displaying a thumbnail image according to an embodiment.
Figure 4:
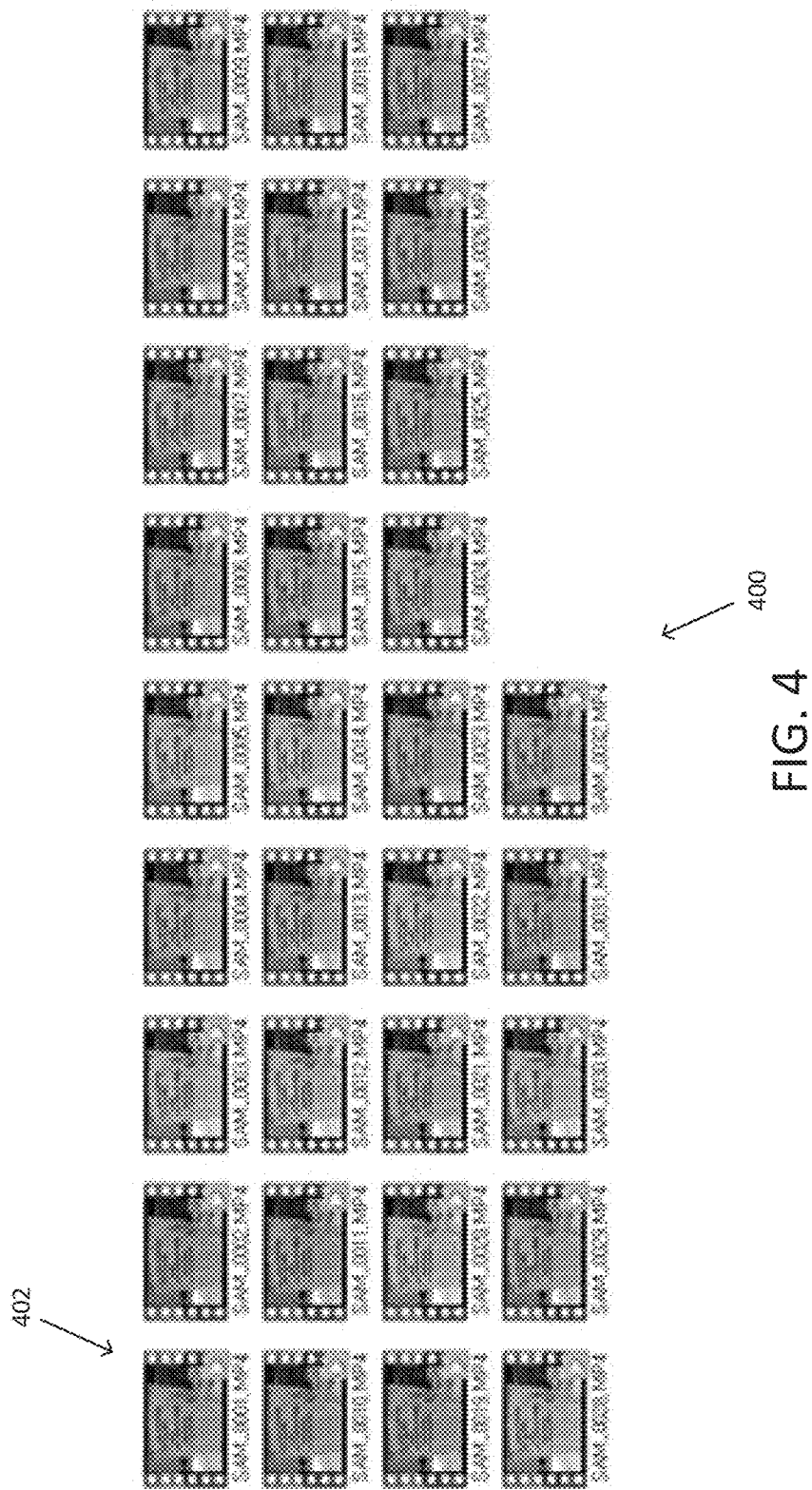
FIG. 4 is a diagram of an example of a screen to display a thumbnail image prior to applying a selected effect in a thumbnail image display apparatus according to an embodiment.
Figure 5:
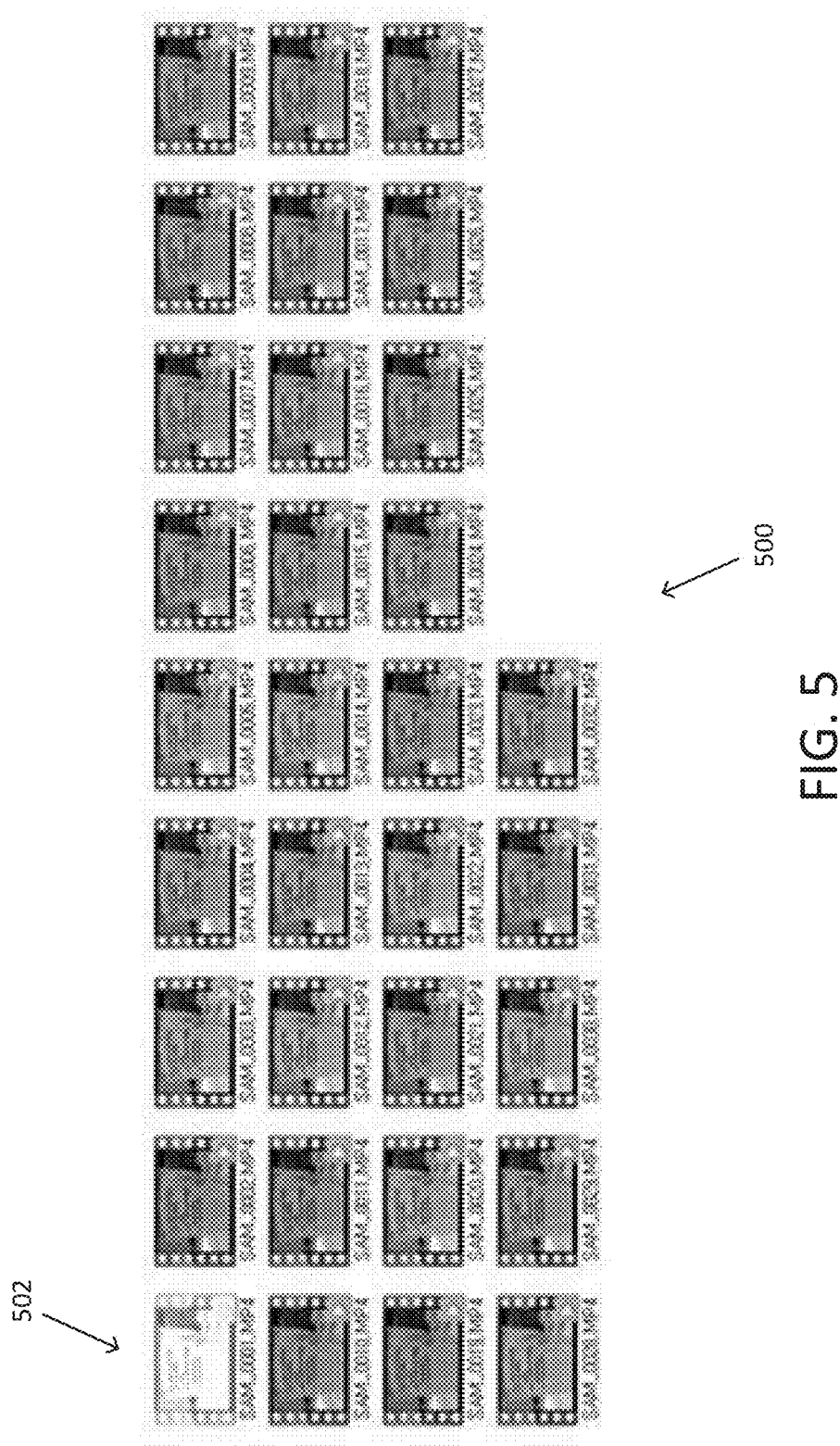
FIG. 5 is a first diagram illustrating an example of a screen to display a thumbnail image to which a selected effect is applied, in a thumbnail image display apparatus according to an embodiment.
Figure 6:
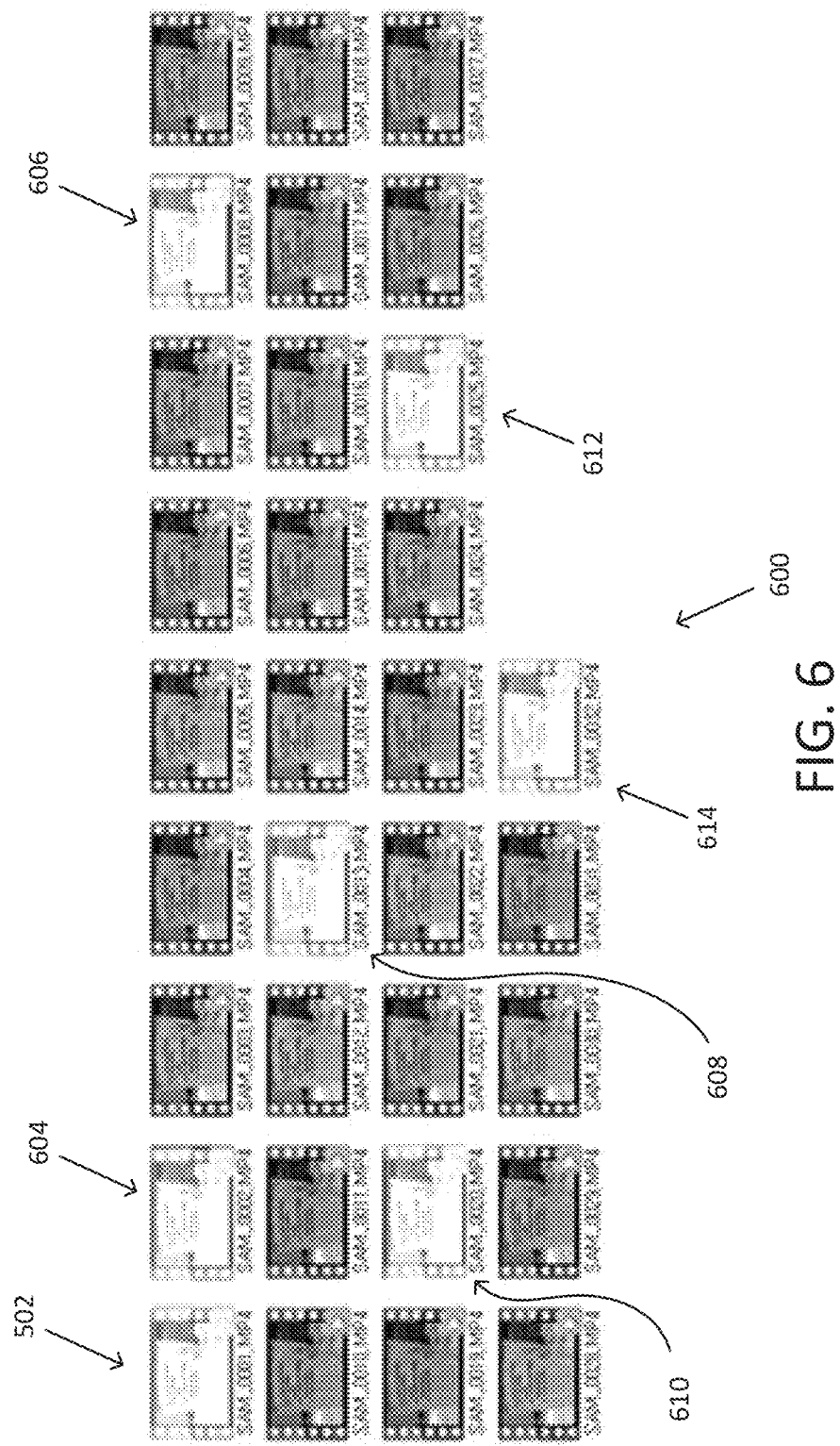
FIG. 6 is a second diagram illustrating an example of a screen to display a thumbnail image to which a selected effect is applied, in a thumbnail image display apparatus according to an embodiment.

FIG. 3 is a flowchart of a method of displaying a thumbnail image according to an embodiment. FIG. 4 is a diagram of an example of a screen to display a thumbnail image prior to applying a specific effect in a thumbnail image display apparatus 100 according to another embodiment. FIG. 5 is a first diagram illustrating an example of a screen to display a thumbnail image to which a specific effect has been applied, in a thumbnail image display apparatus 100 according to an embodiment. FIG. 6 is a second diagram illustrating an example of a screen to display a thumbnail image to which a specific effect is applied, in a thumbnail image display apparatus 100 according to another embodiment.

In FIG. 3, the thumbnail image display apparatus 100 according to the present embodiment loads video or image files stored in the storage unit 140 prior to applying an effect to corresponding thumbnail images of files that have been viewed. The video or image files stored in the storage unit 140 may be one or more of an image pre-stored in a memory from introduction of a corresponding product, an image downloaded from a server, or an image stored via photograph by a user.

Video or image files may be stored in the form of JPG, MP4, BMP, GIF, or other encoding forms. Encoding and decoding processes may be further performed for an image having such form.

Referring to FIG. 3, the controller 150 determines whether a user command is input through the input unit 130 in order to load the video or image files stored in the storage unit 140 (200).

As the determination result of operation 200, when the user command is not input (NO at 200), the controller 150 stands by for an operation of displaying a thumbnail image until the user command is input.

As the determination result of operation 200, when the user command is input (YES at 200), the controller 150 loads the video or image files stored in the storage unit 140 based on the input user command (202).

Then, the controller 150 displays the video or image files loaded from the storage unit 140 through the display unit 120 in the form of a thumbnail image, as illustrated in FIG. 4 (204).

FIG. 4 is a diagram illustrating a screen 400 with a plurality of thumbnail images displayed on the display unit 120 when the user has not viewed any files that correspond to the thumbnail images displayed on the display unit 120. As seen from FIG. 4, an effect such as black and white image processing, color processing, transparency processing, or other visual effect is not applied to any of the thumbnail images displayed in the display unit 120 for the files.

As illustrated in FIG. 4, files in the form of thumbnail images are named SAM_XXXX such as SAM_0001.MP4, SAM_0002.MP4, SAM_0003.MP4, SAM_0004.MP4, SAM_0005.MP4, or SAM_0006.MP4 and are displayed.

Thus, the user may have difficulty in distinguishing the files using only a file name and a thumbnail image and may also have difficulty in searching for a file to view.

Thus, based on the screen 400 illustrated in FIG. 4, the user may select one file to be viewed (e.g., SAM_0001.MP4 corresponding to thumbnail image 402) from the thumbnail images displayed on the screen 400 (206).

When video or an image of the selected file (e.g., SAM_0001.MP4) has been viewed (e.g., viewed from beginning to end) (YES at 208), the controller 150 applies a selected effect to the corresponding thumbnail image 402 of the file that has been viewed, as illustrated in FIG. 5 (210).

FIG. 5 is a diagram illustrating a screen 500 with a plurality of thumbnail images displayed on the display unit 120 when the user has viewed one file (e.g., SAM_0001.MP4). As seen from FIG. 5, transparency processing is performed on only the file (SAM_0001.MP4 corresponding to thumbnail image 502) that has been viewed.

As seen from FIG. 5, transparency processing is performed on a thumbnail image corresponding to file SAM_0001.MP4 in a different way from the other thumbnail images displayed in screen 500.

Thus, when the user wants to view video or an image, the user may observe whether transparency processing has been performed on the corresponding thumbnail image, and thus visibly distinguish between a file that has been viewed (e.g., more transparency processing) from other files that have not been viewed (e.g., less transparency processing), and more easily search for a desired file.

The controller 150 selects other files (e.g., SAM_0002.MP4, SAM_0008.MP4, SAM_0013.MP4, SAM_0020.MP4, SAM_0025.MP4, and SAM_0032.MP4) from the plurality of thumbnail images displayed on the display unit 120 (212), for example, based on further user commands.

When the video or images of the selected files (e.g., SAM_0002.MP4, SAM_0008.MP4, SAM_0013.MP4, SAM_0020.MP4, SAM_0025.MP4, and SAM_0032.MP4) have been viewed (e.g., from beginning to end) (YES at 214), the controller 150 applies a selected effect to thumbnail images of the corresponding files that have been viewed, as illustrated in FIG. 6 (214).

FIG. 6 is a diagram illustrating a screen 600 of a plurality of thumbnail images displayed on the display unit 120 when the user has previously viewed a corresponding plurality of files (e.g., SAM_0001.MP4, SAM_0002.MP4, SAM_0008.MP4, SAM_0013.MP4, SAM_0020.MP4, SAM_0025.MP4, and SAM_0032.MP4). As seen from FIG. 6, transparency processing is performed on the thumbnail images 502, 604, 606, 608, 610, 612, and 614 that correspond to the files (SAM_0002.MP4, SAM_0008.MP4, SAM_0013.MP4, SAM_0020.MP4, SAM_0025.MP4, and SAM_0032.MP4) that have been viewed.

As seen from FIG. 6, transparency processing is performed on the plural files (SAM_0002.MP4, SAM_0008.MP4, SAM_0013.MP4, SAM_0020.MP4, SAM_0025.MP4, and SAM_0032.MP4) that have been subsequently viewed in addition to the file SAM_0001.MP4 that was previously viewed from thumbnail images.

Thus, then, when the user wants to view video or an image, the user may observe that the corresponding thumbnail images for the files SAM_0001.MP4, SAM_0002.MP4, SAM_0008.MP4, SAM_0013.MP4, SAM_0020.MP4, SAM_0025.MP4, and SAM_0032.MP4 on which transparency processing has been performed, distinguish those files as files that have been viewed, and more easily search for a desired file.

According to an embodiment, a case in which a selected effect of transparency processing is applied to a thumbnail image of a file that has been viewed has been described, but the embodiments are not limited thereto. In alternative embodiments, the selected effect may be another type of image processing or visual effect, such as color processing or black and white image processing.

In addition, based on the number of times of viewing a corresponding file, intensity of the selected effect may be gradually increased in intensity such that the user may more easily search for a file that has been viewed several times based on the relative intensity of the effect.

Hereinafter, in addition to the method of applying a selected effect to a file that has been viewed as described above, a method of applying a selected effect to a selected file (e.g., without having to view the file) when a user wants to distinguish a specific file from other files will be described with reference to FIGS. 7 through 9. In this case, the selected effect may be applied to only the thumbnail image of the selected file to distinguish that file from other non-selected files.

Figure 7:
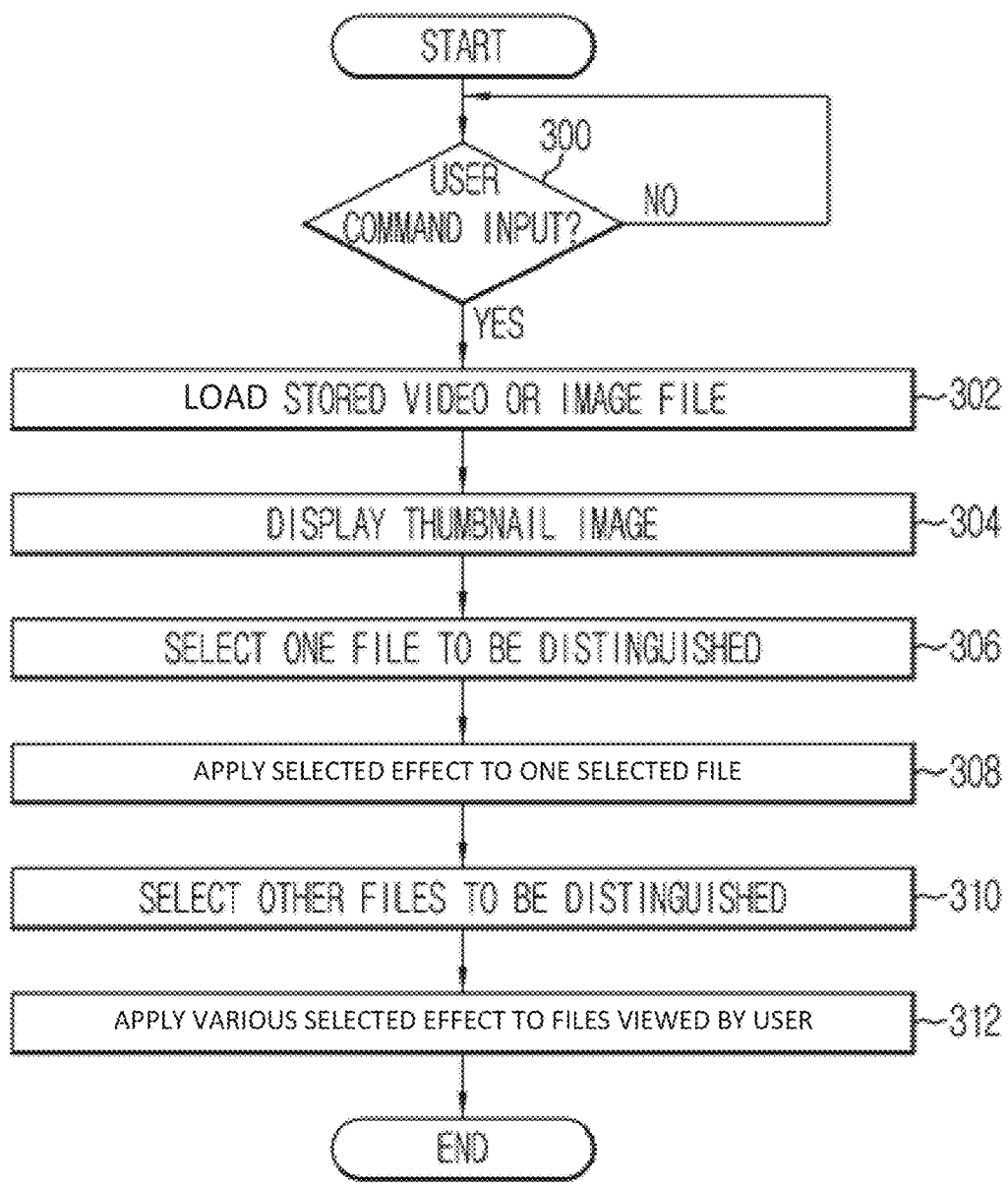
FIG. 7 is a flowchart of a method of displaying a thumbnail image according to another embodiment.

FIG. 7 is a flowchart of a method of displaying a thumbnail image according to another embodiment. FIG. 8 is a third diagram illustrating an example of a screen 800 with a plurality of thumbnail images to which a selected effect is applied, in a thumbnail image display apparatus 100 according to another embodiment. FIG. 9 is a fourth diagram illustrating an example of a screen 900 with a plurality of thumbnail images to which a selected effect is applied, in a thumbnail image display apparatus 100 according to yet another embodiment.

In FIG. 7, the thumbnail image display apparatus 100 according to the present embodiment loads video or image files stored in the storage unit 140 prior to applying an effect to a thumbnail image of a selected file.

First, the controller 150 determines whether a user command is input through the input unit 130 in order to load the video or image files stored in the storage unit 140 (300).

As the determination result of operation 300, when the user command is not input (NO at 300), the controller 150 stands by for an operation of displaying a thumbnail image until the user command is input.

As the determination result of operation 300, when the user command is input (YES at 300), the controller 150 loads the video or image files stored in the storage unit 140 based on the input user command (302).

Then, the controller 150 displays the video or image files loaded from the storage unit 140 through the display unit 120 in the form of a plurality of thumbnail images, as illustrated in FIG. 4 (304).

As illustrated in FIG. 4, files displayed as thumbnail images are displayed in the format SAM_XXXX such as SAM_0001.MP4, SAM_0002.MP4, SAM_0003.MP4, SAM_0004.MP4, SAM_0005.MP4, and SAM_0006.MP4.

Thus, the user may have difficulty in distinguishing files using only a file name and a thumbnail image and may also have difficulty in searching for a desired file.

Thus, based on the screen 400 illustrated in FIG. 4, the user may select one file to be distinguished (e.g., SAM_0001.MP4 corresponding to thumbnail image 402) from the plurality of thumbnail images displayed (306).

Figure 8:
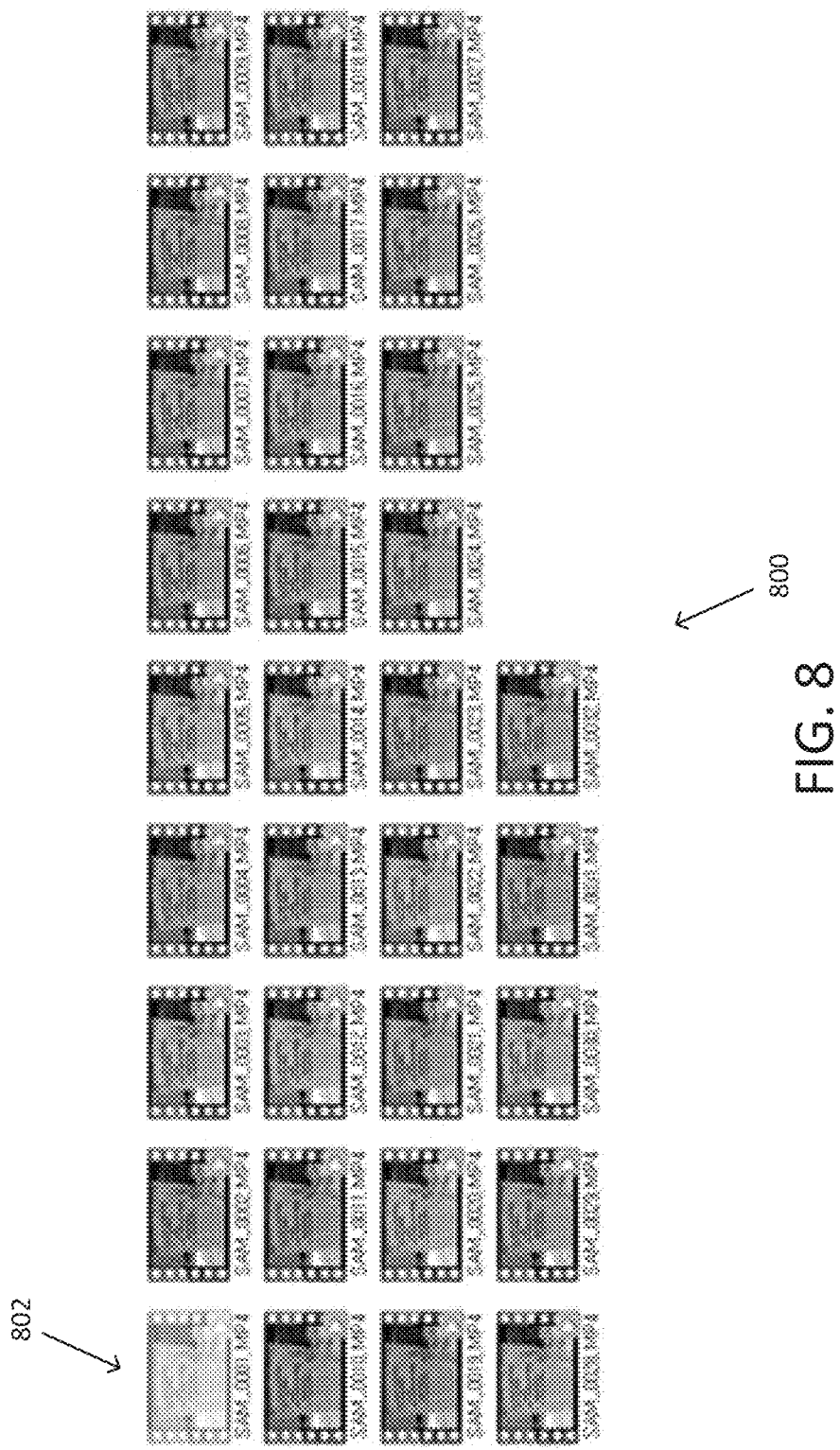
FIG. 8 is a third diagram illustrating an example of a screen to display a thumbnail image to which a selected effect is applied, in a thumbnail image display apparatus according to another embodiment.

When one file to be distinguished (e.g., SAM_0001.MP4) is selected, the controller 150 applies a selected effect to the corresponding thumbnail image 402 of the selected file, illustrated as thumbnail image 802 in FIG. 8 (308).

FIG. 8 is a diagram illustrating a screen 800 to display thumbnail images displayed on the display unit 120 when the user selects one file (e.g., SAM_0001.MP4) to be distinguished. As seen from FIG. 8, green color processing is performed on the thumbnail image 802 corresponding to the selected file (SAM_0001.MP4).

As seen from FIG. 8, green color processing is performed on the thumbnail image corresponding to the selected file SAM_0001.MP4 in a different way from the other thumbnail images displayed.

Thus, when the user wants to search for a file, the user may observe which thumbnail image has had color processing performed and distinguish that thumbnail image and corresponding file from the other files.

In addition, the controller 150 selects other files (e.g., SAM_0002.MP4, SAM_0008.MP4, SAM_0013.MP4, SAM_0020.MP4, SAM_0025.MP4, and SAM_0032.MP4) to be distinguished from the thumbnail images displayed on the display unit 120 (310).

Figure 9:
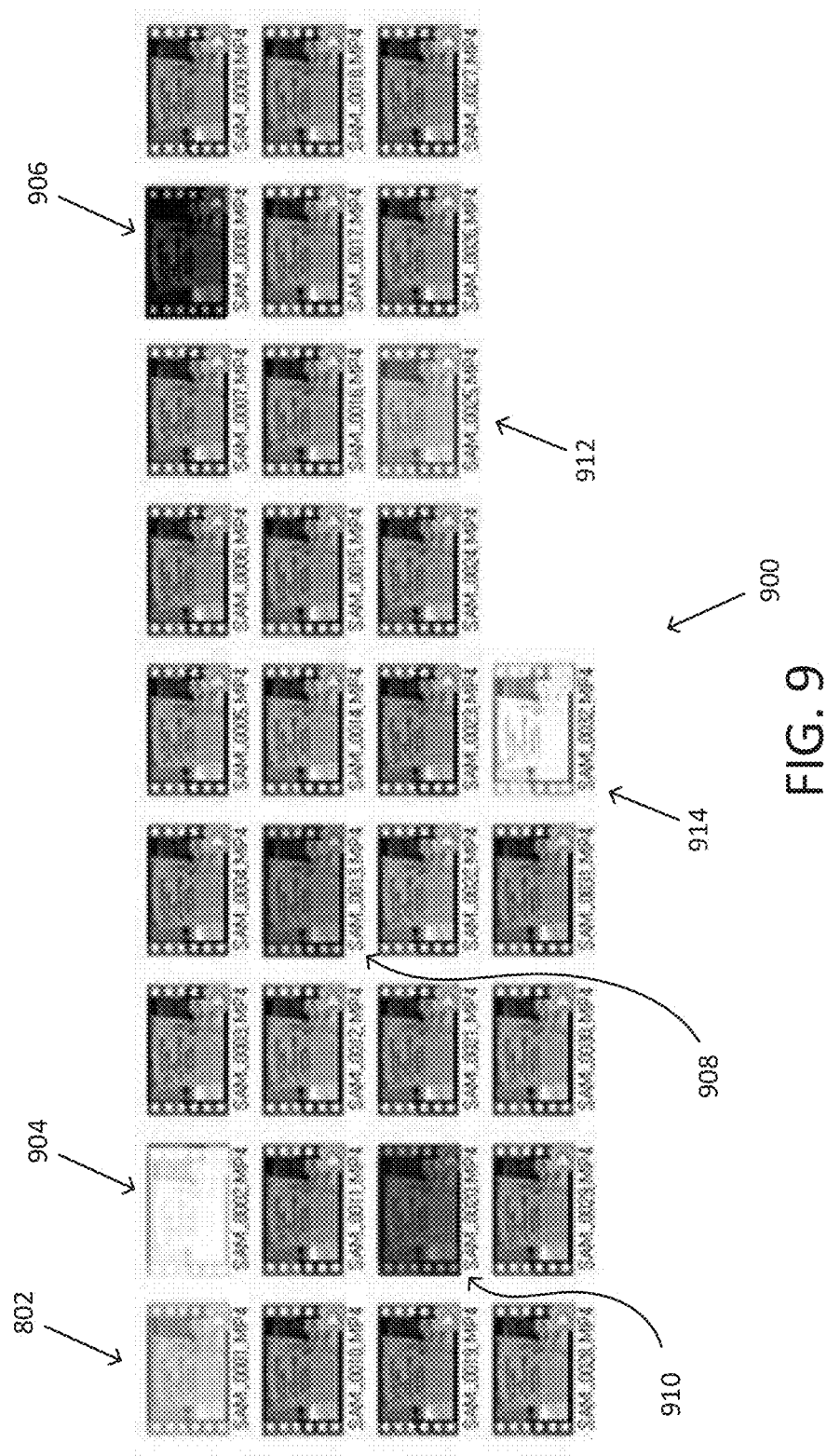
FIG. 9 is a fourth diagram illustrating an example of a screen to display a thumbnail image to which a selected effect is applied, in a thumbnail image display apparatus according to another embodiment.

When the other files (e.g., SAM_0002.MP4, SAM_0008.MP4, SAM_0013.MP4, SAM_0020.MP4, SAM_0025.MP4, and SAM_0032.MP4) to be distinguished are selected, the controller 150 applies various selected effects to the corresponding thumbnail images of the selected files, as illustrated in FIG. 9 (312).

FIG. 9 is a diagram illustrating a screen 900 with a plurality of thumbnail images displayed on the display unit 120 when the user has selected a plurality of files (e.g., SAM_0002.MP4, SAM_0008.MP4, SAM_0013.MP4, SAM_0020.MP4, SAM_0025.MP4, and SAM_0032.MP4) to be distinguished. As seen from FIG. 9, color processing is performed in various colors on the thumbnail images 802, 904, 906, 908, 910, 912, and 914 corresponding to the plurality of selected files, respectively (e.g., SAM_0002.MP4, SAM_0008.MP4, SAM_0013.MP4, SAM_0020.MP4, SAM_0025.MP4, and SAM_0032.MP4).

As seen from FIG. 9, color processing is performed in various colors on the plural files (SAM_0002.MP4, SAM_0008.MP4, SAM_0013.MP4, SAM_0020.MP4, SAM_0025.MP4, and SAM_0032.MP4) that have been subsequently selected in addition to the file SAM_0001.MP4 that was previously selected from the thumbnail images displayed.

Thus, when the user wants to search for a specific file, the user may observe which thumbnail image has had color processing performed in the various colors and distinguish one file from another.

According to an embodiment, although a case in which a selected effect of color processing is applied to a thumbnail image of a file that has been selected by the user has been described, other embodiments are not limited thereto. For example, in alternative embodiments, other image processing or visual effect such as transparency processing or black and white image processing may be performed on the selected thumbnail images.

Although a few embodiments have been shown and described, it would be appreciated by those skilled in the art that changes may be made in these embodiments without departing from the principles and spirit of the invention, the scope of which is defined in the claims and their equivalents.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of displaying a thumbnail image on a display of an image display apparatus, the method comprising:
    displaying a plurality of thumbnail images on the display which is formed at one side of a main body of the image display apparatus that corresponds to a plurality of files stored in a storage unit of the image display apparatus, wherein the plurality of files includes at least one of a video file and an image file;
    receiving a selection of a thumbnail image by a user from the plurality of displayed thumbnail images, wherein the selection of the thumbnail image includes a selection of the corresponding file of the plurality of files to be viewed by the user;
    in response to receiving the selection of the thumbnail image, determining whether viewing of the corresponding selected file is complete;
    applying a predetermined effect to the selected thumbnail image to generate a modified thumbnail image once viewing of the corresponding selected file is complete, wherein the applying comprises applying the predetermined effect to the thumbnail image of only the selected file to distinguish the corresponding selected file from other non-selected files; and
    displaying the modified thumbnail image to which the predetermined effect has been applied, wherein the modified thumbnail image is displayed among the remaining plurality of thumbnail images, and the predetermined effect applied to the selected thumbnail image is maintained upon receiving a selection of a different thumbnail image from the plurality of displayed thumbnail images,
    wherein an intensity of the predetermined effect is variable, the intensity of the predetermined effect applied to the selected thumbnail image is gradually increased based on a number of times the corresponding selected file has been viewed,
    and
    wherein the predetermined effect comprises at least one of black and white image processing, color processing, and transparency processing selected by the user of the image display apparatus.

* * * * *